United States Patent
Lamba et al.

(10) Patent No.: US 10,931,544 B2
(45) Date of Patent: Feb. 23, 2021

(54) CLIENT-SIDE SERVICE ROUTING MECHANISM

(71) Applicant: International Business Machines Corporation, Armonk, NY (US)

(72) Inventors: Amit H. Lamba, Buffalo Grove, IL (US); Brian F. Ober, Lake In The Hills, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 206 days.

(21) Appl. No.: 16/016,765

(22) Filed: Jun. 25, 2018

(65) Prior Publication Data

US 2019/0394100 A1 Dec. 26, 2019

(51) Int. Cl.
   G06F 15/173 (2006.01)
   H04L 12/24 (2006.01)
   H04L 29/08 (2006.01)
   G06F 15/16 (2006.01)

(52) U.S. Cl.
   CPC ........ *H04L 41/5032* (2013.01); *H04L 67/025* (2013.01); *H04L 67/1097* (2013.01); *H04L 67/327* (2013.01)

(58) Field of Classification Search
   CPC ............. H04L 41/0896; H04L 41/5019; H04L 41/5051; H04L 47/72; H04L 47/826
   USPC ................................................. 709/224, 217
   See application file for complete search history.

(56) References Cited

U.S. PATENT DOCUMENTS

| 7,424,666 | B2 | 9/2008 | Chandwani et al. |
| 8,539,080 | B1* | 9/2013 | Uluderya ............... H04L 45/70 709/226 |
| 8,977,905 | B2 | 3/2015 | Zhu et al. |
| 9,160,639 | B2 | 10/2015 | Lai et al. |
| 9,450,839 | B2 | 9/2016 | Patel et al. |
| 2004/0128372 | A1 | 7/2004 | Mukherjee et al. |
| 2007/0133406 | A1 | 6/2007 | Vasseur |
| 2015/0257081 | A1* | 9/2015 | Ramanujan ........... H04L 45/125 370/329 |

(Continued)

OTHER PUBLICATIONS

Anonymous; IBM Tivoli Workload Scheduler, Troubleshooting Guide; 2001, 2014; 256 pgs; Ver. 9, Release 2; IBM Corp.

(Continued)

*Primary Examiner* — Karen C Tang
(74) *Attorney, Agent, or Firm* — James Nock; Andrew D. Wright; Roberts Calderon Safran & Cole. P.C.

(57) ABSTRACT

A computing device identifies and classify errors detected between the client application and the computing service, maintains service specific statistics across all communication points associated with the computing service, and stores the statistics within a metric data store. The computing device also provides an interface for introspecting the health of the computing service via metrics stored within the metric data store, monitors the health of the computing service via the metric data store, and assigns an operational state to the computing device based on metrics stored with the metric data store. The computing device then determines how to optimally route the client request based on the operational state of the computing service and routes the client request to the computing service via the optimal route.

19 Claims, 7 Drawing Sheets

(56) References Cited

U.S. PATENT DOCUMENTS

2018/0307748 A1* 10/2018 Freilinger .......... G06F 16/3346

OTHER PUBLICATIONS

Boloni et al.; The Bond Agent System and Applications; Department of Computer Science Technical Reports; Paper 1486; 2000; 17 pgs.

* cited by examiner

CLIENT-SIDE SERVICE ROUTING MECHANISM

BACKGROUND

This present application relates to dispersed storage systems, and more specifically, to a client-side service routing mechanism to improve reliability, availability and performance of computing services.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc., on an Internet storage system. The Internet storage system may include a RAID (redundant array of independent disks) system and/or a dispersed storage system that uses an error correction scheme to encode data for storage.

SUMMARY

According to an embodiment of the invention, a computing device identifies and classify errors detected between the client application and the computing service, maintains service specific statistics across all communication points associated with the computing service, and stores the statistics within a metric data store. The computing device also provides an interface for introspecting the health of the computing service via metrics stored within the metric data store, monitors the health of the computing service via the metric data store, and assigns an operational state to the computing device based on metrics stored with the metric data store. The computing device then determines how to optimally route the client request based on the operational state of the computing service and routes the client request to the computing service via the optimal route.

DETAILED DESCRIPTION

Typical cloud computing (for example a cloud provided service) is comprised of several computing and network elements, required for capacity, availability, performance, and scale. Such services should ensure a very high level of reliability to all service clients, which could include end-users or other computing services. To achieve this, such services use monitoring mechanisms to both monitor and load balance traffic across their various instances. These components are also responsible to remove network elements and service instances if they become unresponsive as to not interfere with user experience.

Figure 1A:
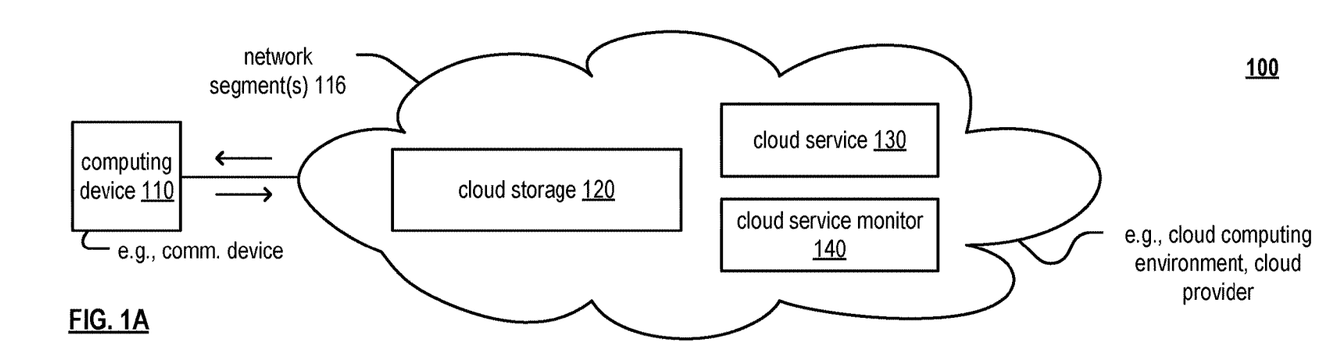
FIG. 1A is a diagram illustrating an embodiment of one or more communication systems supporting a cloud service according to various embodiments of the present invention.

FIG. 1A is a diagram illustrating an embodiment 100 of one or more communication systems supporting cloud-based services. One or more computing devices (e.g., computing device 110) is configured to support communications via one or more other computing devices (not shown) and/or one or more network segments 116. The one or more network segments 116 may be implemented in accordance with a cloud computing environment 50, including cloud storage 120, such as described with reference to FIG. 5. The one or more network segments 116 may include one or more other computing devices therein (e.g., nodes, routers, gateways, servers, relays, transcoders, etc.) in some examples and/or embodiments.

The computing device 110 may also be configured to transmit (e.g., via the one or more network segments 116) data to another computing device (not shown) that is associated with cloud service 130. The computing device 110 is also configured to receive data via the one or more network segments 116 and/or the cloud service 130. Examples of such data may include one or more of: personal information, health data, financial data, strategic plans, competitive information, trade secrets, bitcoin wallets, customer lists, and/or any other type of data that may be private, secret, and/or of high value.

The computing device 110 is also configured to access various cloud services 130. For example, the computing device 110 may be configured to access medical information that is stored within the one or more network segments 116 and/or stored within a cloud-based technology that is based on or accessible via the one or more network segments 116.

In general, cloud service 130 may be viewed as being a system for managing, reliably maintaining, and controlling access to services on behalf computing devices, users, and/or applications, etc. High availability and durability is critical for a cloud service. For example, considering a particular instance, if the cloud service fails, any attempt to restore data will also fail. Service specific monitoring mechanisms (e.g., cloud service monitor 140) are typically deployed along with their cloud service and therefore exist within the same physical location where the service is being hosted.

The various communication links within the one or more network segments 116 may be implemented using any of a variety of communication media including communication links implemented as wireless, wired, optical, satellite, microwave, and/or any combination thereof, etc. communication links. In general, the one or more network segments 116 may be implemented to support a wireless communication system, a wire lined communication system, a non-public intranet system, a public internet system, a local area network (LAN), a wireless local area network (WLAN), a wide area network (WAN), a satellite communication system, a fiber-optic communication system, and/or a mobile communication system. Also, in some instances, communication links of different types may cooperatively form a connection pathway between any two communication devices. Considering one possible example, a communication pathway between computing device 110 and cloud service 130 may include some segments of wired communication links and other segments of optical communication links. Note also that the computing device(s) 110 may be of a variety of types of devices including stationary devices, mobile devices, portable devices, etc. and may support communications for any of a number of services or service flows including data, telephony, television, Internet, media, synchronization, etc.

In an example of operation and implementation, device 110 includes a communication interface (e.g., see FIG. 7, 716) to support communications with a communication network (e.g., the one or more network segments 116), memory (e.g., see FIG. 7, 708) that stores operational instructions, and a processor (e.g., see FIG. 7, 702) coupled to the communication interface and to the memory. The processor (with processing circuitry) is configured to execute the operational instructions to perform various functions, operations, etc. Note that the communication supported by the computing device 110 may be bidirectional/to and from the one or more cloud elements (e.g., storage, services, etc.) or other computing devices or unidirectional (or primarily unidirectional).

Figure 7:
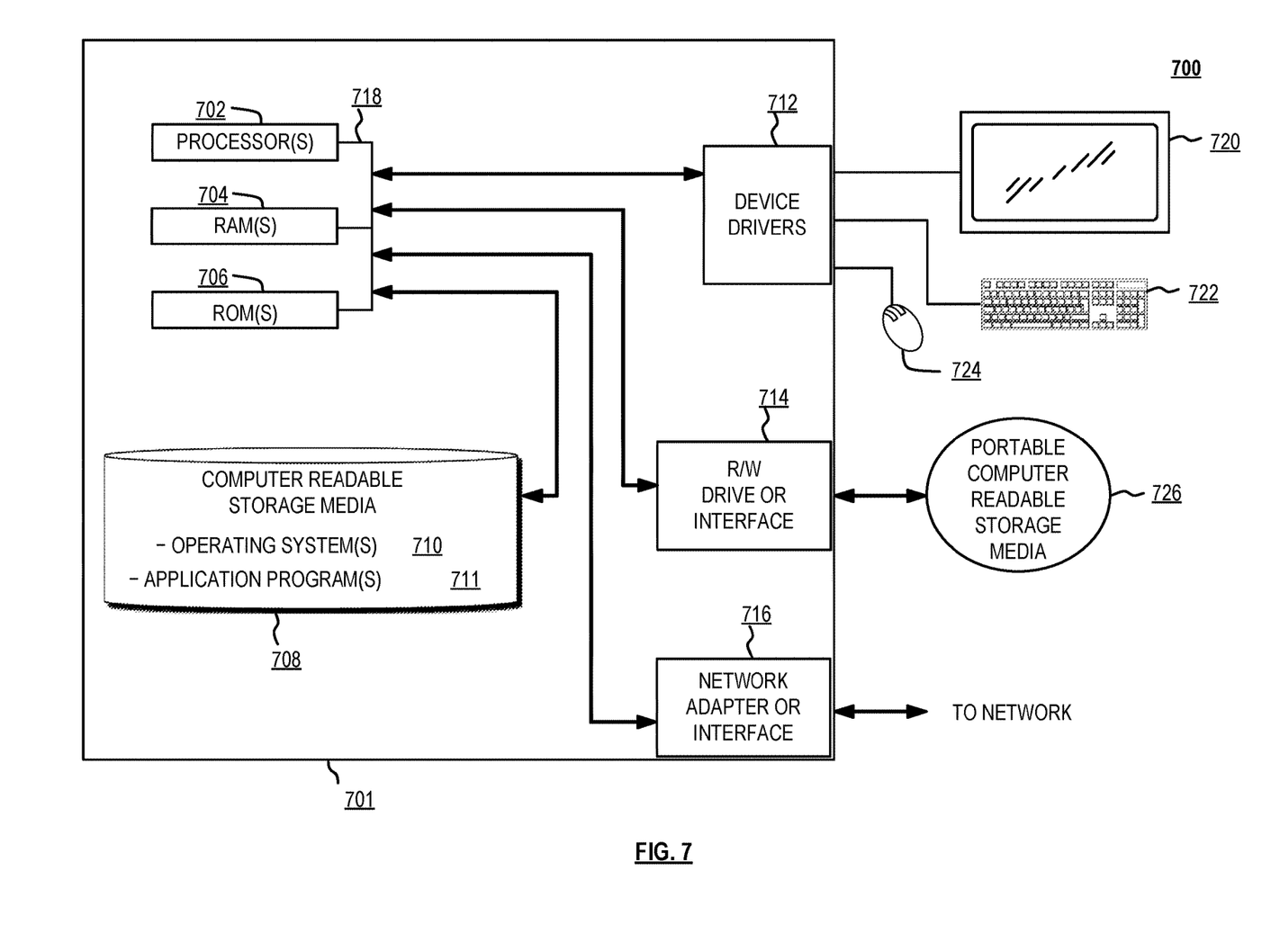
FIG. 7 depicts a block diagram of a computing device according to various embodiments of the present invention.

In one example, computing device 110 includes a processor 702 that generates, modulates, encodes, etc. and transmits signals via a communication interface 716 and also receives and processes, demodulates, decodes, etc. other signals received via the communication interface 716 (e.g., received from cloud storage 120, cloud services 130, etc.).

Note also that the communication device 110 may include functionality to support receipt of user input and output of user output (e.g., via a touchscreen, a keyboard 722, audio and/or video 720 input/output ports, etc.) to facilitate interaction with one or more users of the computing device 110. Such functionality is implemented separately 712 from the communication interface 716 in some examples and is integrated into the communication interface in other examples.

Some examples of possible computing devices 110 that may be implemented to operate in accordance with any of the various examples, embodiments, options, and/or their equivalents, etc. described herein may include, but are not limited by, appliances within homes, businesses, etc. such as refrigerators, microwaves, heaters, heating systems, air conditioners, air conditioning systems, lighting control systems, and/or any other types of appliances, etc.; meters such as for natural gas service, electrical service, water service, Internet service, cable and/or satellite television service, and/or any other types of metering purposes, etc.; devices wearable on a user or person including watches, monitors such as those that monitor activity level, bodily functions such as heartbeat, breathing, bodily activity, bodily motion or lack thereof, etc.; medical devices including intravenous (IV) medicine delivery monitoring and/or controlling devices, blood monitoring devices (e.g., glucose monitoring devices) and/or any other types of medical devices, etc.; premises monitoring devices such as movement detection/monitoring devices, door closed/ajar detection/monitoring devices, security/alarm system monitoring devices, and/or any other type of premises monitoring devices; multimedia devices including televisions, computers, audio playback devices, video playback devices, and/or any other type of multimedia devices, etc.; and/or generally any other type(s) of device(s) that include(s) wireless communication capability, functionality, circuitry, etc. In general, any device that is implemented to support wireless communications may be implemented to operate in accordance with any of the various examples, embodiments, options, and/or their equivalents, etc. described herein.

Figure 1B:
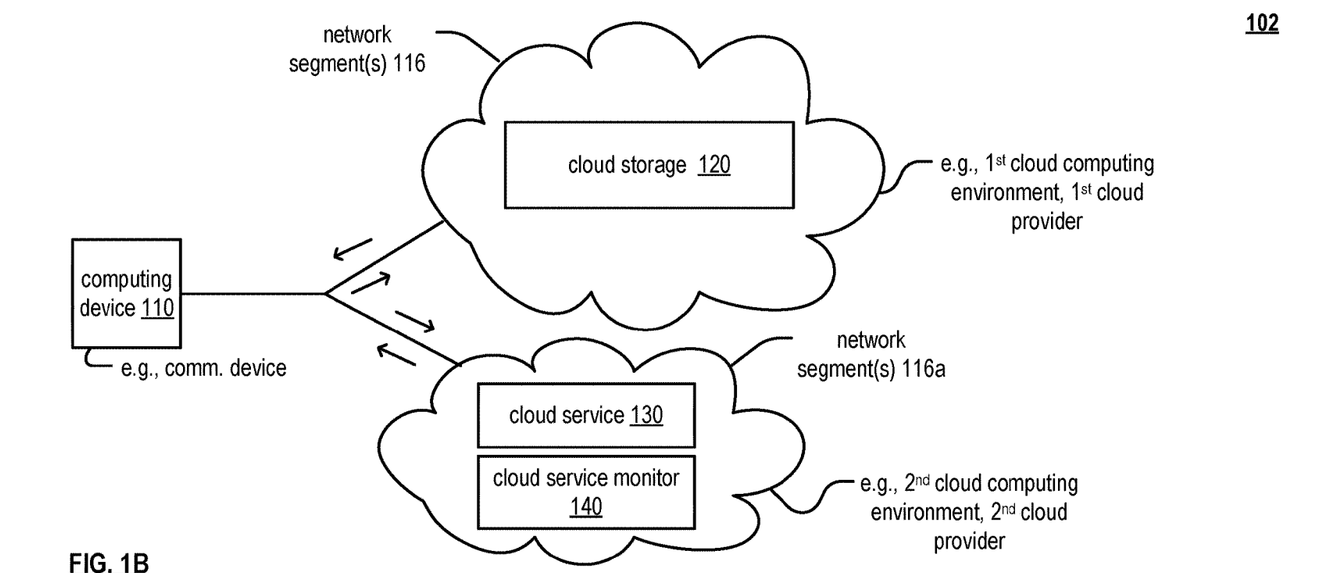
FIG. 1B is a diagram illustrating an embodiment of one or more communication systems supporting a cloud service according to various embodiments of the present invention.

FIG. 1B is a diagram illustrating an embodiment 102 of one or more communication systems supporting cloud-based services. Service specific cloud service monitoring mechanisms are typically deployed along with their corresponding cloud service and therefore exist within the same physical location where the cloud service is being hosted. In this embodiment, both the cloud service 130 and cloud service monitor 140 are deployed in a separate cloud computing environment shown as network segments 116a (e.g., second cloud computing environment, second cloud provider).

Figure 2:
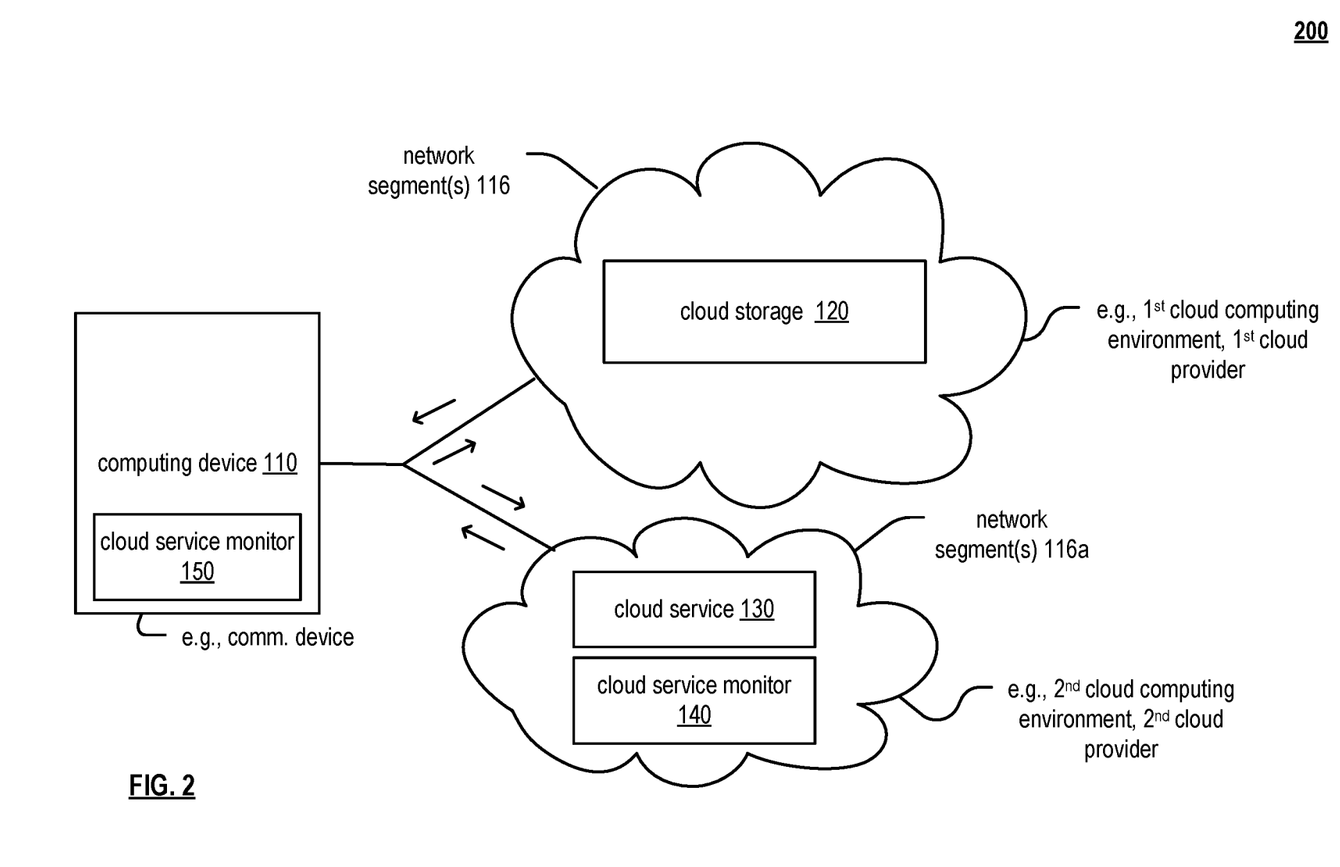
FIG. 2 is a diagram illustrating another embodiment of a client-side service monitor supporting a cloud service according to various embodiments of the present invention.

FIG. 2 is a diagram illustrating another embodiment of a client-side service monitor supporting a cloud service according to various embodiments of the present invention. It is possible that the client application is deployed in a location external to where the service is deployed (e.g. external to the cloud, in another cloud, or in a different data center). In such cases, any monitoring mechanisms (e.g., cloud service monitor 140) deployed by the computing service are not effective to detect all problems that prevent a service client from successfully communicating with the computing service. For example, problems could be due to network partitions that occur between the data center running the client application and the data center that client application requests are getting routed to. These problems may be intermittent or long lasting. Being unable to detect such problems, results in a service that potentially fails to deliver the availability, reliability, and end user experience that has been committed as part of a service level agreement.

In one embodiment, to mitigate these undetected failures, an intelligent and robust monitoring mechanism (cloud service monitor 150) can be co-located with the client (computing device 110) allowing it to take over for cloud service monitor 140 and intelligently route requests (e.g., based on locations where the service is known to be healthy and reachable) and to do so in a way that is transparent to the service client experience.

Figure 3:
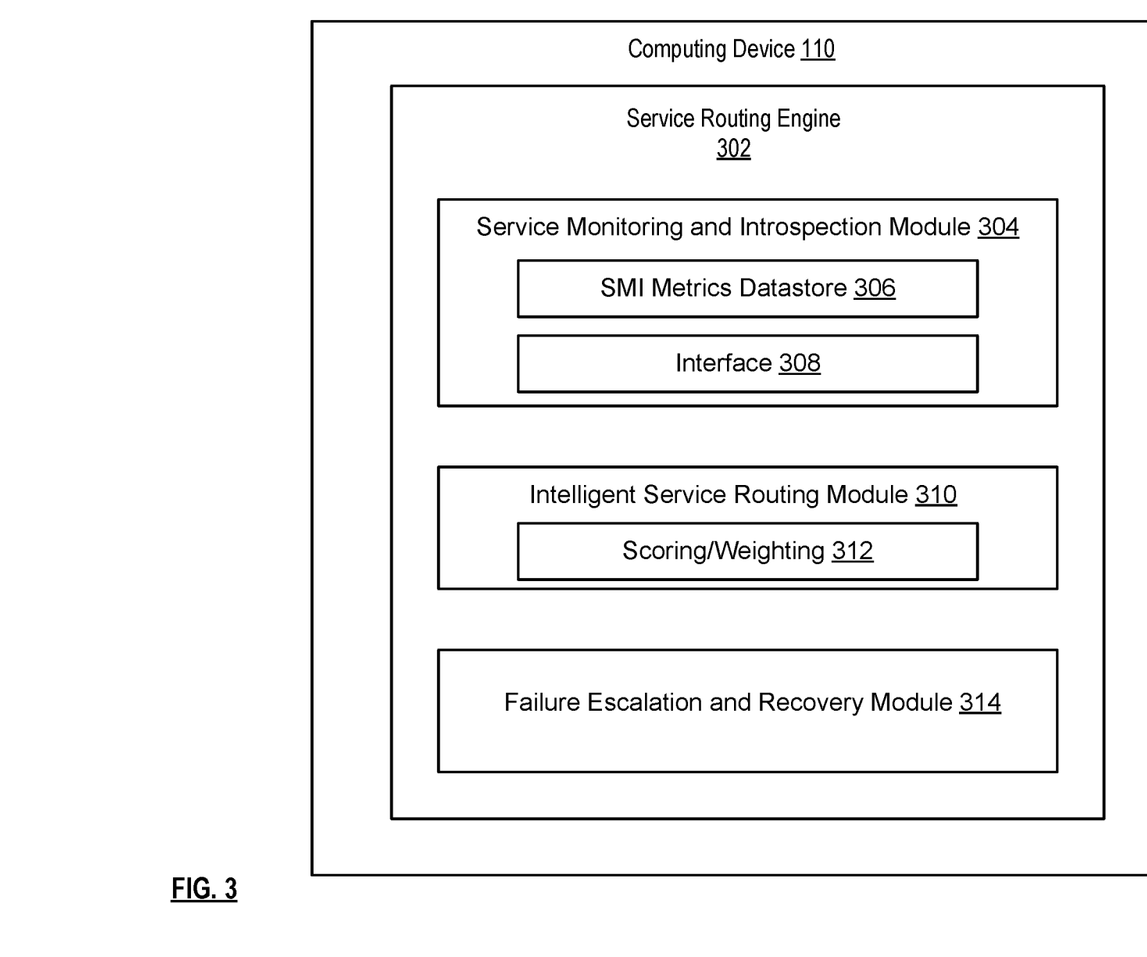
FIG. 3 is a diagram illustrating another embodiment of a client-side service monitor supporting a cloud service according to various embodiments of the present invention.

FIG. 3 is a diagram illustrating an embodiment of a client-side service monitor 150 supporting a cloud service 130. This diagram shows a computing device 110 that is configured to interact with a cloud storage service 120 and a cloud service 130 that are both implemented within the same environment (e.g., FIG. 1A illustrating one or more network segments 116 that may be implemented as a cloud computing environment, a cloud provider, etc.) or in separate environments as shown in FIG. 1B. The cloud storage service 120 may include various types of data or secure information (e.g., key protected data, wrapped key, etc. and/or other secure information). The cloud service 130 may include one or more cloud service monitors 140 that may be used by one of more users associated with one or more computing devices to monitor access to the various types of data or secure information.

In this implementation, when two separate and distinct cloud providers are used for the cloud storage service 120 and a cloud service 130, respectively, there can be higher complexity of the overall system, and there can be a likelihood of incompatible Application Program Interfaces (APIs). As such certain interoperability issues and other problems may emerge. For example, note that while customer doesn't necessarily need to have complete trust in any one specific provider, this implementation can unfortunately introduce a number of interoperability issues. For example, APIs and libraries for interfacing between the two services may not be compatible.

In one embodiment, client-side mechanism (e.g., cloud service monitor 150) is provided to intelligently route requests to a best available instance of a computing service. It quantifies the health of the computing service by maintaining metrics associated with service endpoints and then using that to compute overall health of the service. The health of the service is used to drive the client perceived state of the service. This in turn influences weights that are assigned to a service endpoint of group of endpoints that will ultimately determine how the client requests will be routed. The advantage here is that outside of normal operating state, the client takes over routing decisions based on its view of the computing service. Typical computing service monitoring is not co-located with the client and therefore does not see the view of the computing service from the perspective of the client.

According to one embodiment, a component, referred to as a Service Routing Engine (SRE) 302 provides the cloud service monitoring functionality as well as routing, escalation and recovery and is co-located with the client. The SRE includes at least three parts: Service Monitoring and Introspection (SMI) module 304, Intelligent Service Routing module (ISR) 310, and Failure Escalation and Recovery (FER) module 314.

The Service Monitoring and Introspection 304 part of the SRE identifies and classifies errors seen between client application and the computing service. Errors are classified into different categories based on several factors, including explicit error responses or other known faults. These may include, but are not limited to, connection timeouts, request write timeouts, response read timeouts, temporary service unavailability errors, overload protection errors, network routing errors, etc.

SMI also maintains service specific statistics across all service communication points (e.g., HTTP endpoints) associated to the service and are stored within a service endpoint metric database, such as a SMI Metrics Datastore (SM-MD) 306 (e.g., a database, local data structure, a cloud data science engine, etc.). Such statistics include success, errors, latency, caching performance, location, etc.

SMI module 304 also provides an interface 308 for computing service operators to introspect the health of the service using the metrics available in the SM-MD. In addition, the computing service operators can tune certain parameters that can influence the service routing decisions as described hereafter.

The Intelligent Service Routing 310 part of SRE uses the SM-MD 306 to examine trends across different service endpoints to make decisions as to how to most optimally route the application request. Several strategies can be employed for making routing decisions. This could be as simple as routing based on closest location or more advanced where a score is computed for individual service endpoints using the metrics available in SM-MD.

In addition to the metrics, weight can be assigned to service endpoints 312. Using these weights, traffic can be steered towards a service endpoint(s) by increasing the weight associated with it. Alternatively, traffic could be steered away from communication point(s) by reducing the weight associated with it. Service endpoints can be grouped together into tiers by assigning same weight to the endpoints in the same tier. These tiers can then be used to provide primary, secondary, tertiary tiers of service. The weight associated with the endpoints or tiers can be dynamically adjusted to react to error conditions to make one endpoint or tier more favorable than the other.

One example simplified scoring system that uses both metrics and endpoint weight can calculate a score as follows:

$$Se = Wes(1-Ee)/(Le) \text{ where:}$$

Se—is the score associated with a service endpoint

Wes—is the weight assigned to a service endpoint or tier depending on the state of SRE Ee—is error ratio (number of errors/number of requests) for the service endpoint Le—is an average latency measured on the service endpoint ISR module 310 will use the score of an endpoint to weight the amount of client application requests directed to the endpoint. This allows ISR to make intelligent load balancing decision across the available service endpoints.

The Failure Escalation and Recovery mechanism 314 of SRE is responsible for reacting to changes in health of computing services and adjusting the operational state of the SRE. The health of the computational service will dictate the operational state of the SRE. For example, the operation state of the SRE can vary from normal to degraded to failover (disaster recovery) depending on the amount of errors being seen.

To make a quantitative decision of the health of the service, FER 314 leverages data stored within the SM-MD 306, like error rate, latency etc. One simple method is for FER 314 to maintain an overall error score for the system (Es) that reflects the total error rates across all service endpoints.

$$Es = \sum_{e=1}^{N} Ee$$

Other advanced methods include keeping score for group or tier of endpoints. Once FER 314 can quantify the health of the computing service, it can compare against preconfigured thresholds to change the state of SRE 302. In a normal state, SRE 302 is acting as a normal client and leaves routing, load balancing decisions on the server side of the computing service (as dictated by cloud service monitor 140).

Outside of the normal state, SRE 302 takes over request routing decisions essentially shifting the load balancing decision from the server side (as dictated by cloud service monitor 140) to the client side. Based on an operational state outside of normal operating state, the SRE determines to optimally route the client request with direction from the client by superseding server-side routing decisions.

As the health of the computing service improves, FER would roll back the error state escalation and get SRE back to normal state. At this point SRE relinquishes request routing and load balancing decisions back to the computing service's default server-side mechanism.

As FER modifies the state of SRE, ISR reacts to the state change by updating its routing decisions. If ISR is maintaining scores of the endpoints as illustrated in the example, it will re-calculate the scores based on the updated weights assigned to the service endpoints or tiers for that SRE state.

The following example will illustrate how the different parts of SRE work together to optimally route request from a client application to the best available instance of a compute service to achieve high availability, reliability and performance for the application using the service. This example assumes the simple endpoint scoring and system error scoring as illustrated in the equations in the above sections. This example also assumes that the compute service has classified its service endpoints into groups for primary access, secondary access and tertiary access.

Under normal conditions where the cloud service is fully available, SM-MD metrics will indicate low to 0 error ratio (Ee) for the different service endpoints. Thus, FER will compute overall system error Es to be very low. It will thus have SRE in the normal state.

Under normal state the weight assigned to the primary tier is the highest. Secondary and tertiary tiers are not given any weight. This causes all requests to be routed via the computing service's primary endpoint. For example, under normal conditions, SRE send requests to mycloudservice.mycloud.com.

Under conditions where the computing service is partially unavailable, Ee for impacted endpoints will increase and ISR will compute a lower score for these endpoints and direct less requests to them. As the error ratio keeps increasing, FER will calculate higher value of Es and once it crosses normal threshold, FER will move SRE to degraded state.

In degraded state the weight assigned to the secondary tier is the highest. Primary has low weight and no weight is given to tertiary. This effectively will cause ISR to steer traffic away from the primary tier towards the secondary tier. For example, SRE will send requests to mycloudserivce.us-south.mycloud.com, mycloudserivce.uswest.mycloud.com, mycloudserivce.useast.mycloud.com and mycloudserivce.usnorth.mycloud.com.

Under conditions where the computing service is unavailable in an entire region (disaster scenario), Ee for impacted endpoints will keep increasing. FER will calculate higher value of Es and once it crosses critical threshold, FER will move SRE to failover state.

In failover state, the weight assigned to the tertiary tier is the highest. Primary and secondary tier are given low weights. This will steer the traffic away from the primary and secondary service endpoints and failover the traffic to the tertiary service endpoints. These endpoints would typically be in a different region so that they are not by the same regional disaster experienced by primary and secondary endpoints. For example, SRE will send requests to mycloudservice.eu.mycloud.com.

As the computing service is recovered from the different failure scenarios, Es shall start falling. Once below critical levels, FER will change the state of SRE to degraded state and requests will be directed away from the tertiary and back to the secondary endpoints. Ultimately when Es has reduced back to normal level, FER will move SRE back to normal state and will be directed away from secondary back via the primary endpoint.

As illustrated in the example above, SRE allows a client application to react quickly to unavailability errors associated with a computing service. Using weighted tier and scoring mechanism, requests are directed to best available service endpoints avoiding additional delays under normal operating conditions.

Figure 4:
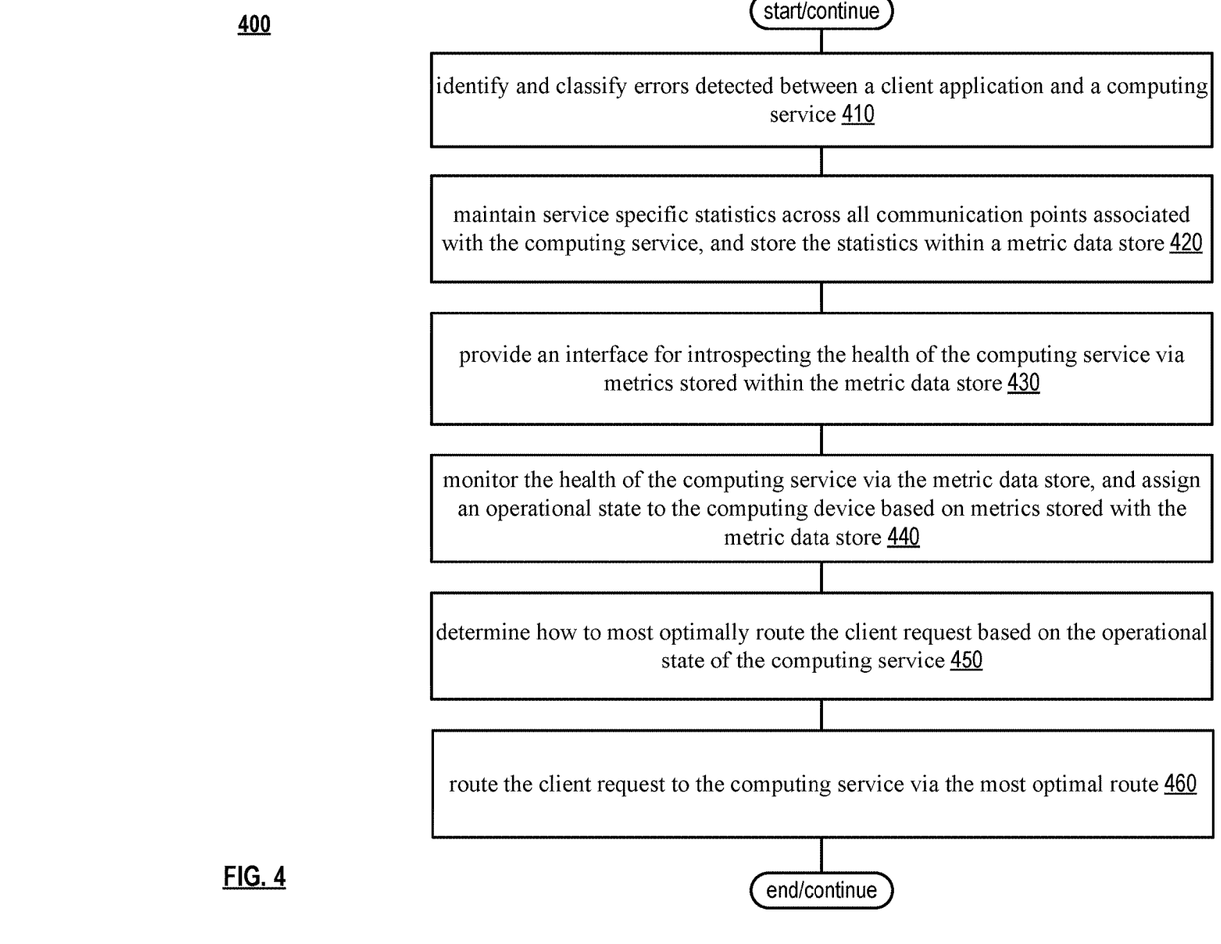
FIG. 4 is a flow diagram illustrating a client-side service monitor supporting a cloud service according to various embodiments of the present invention.

FIG. 4 is a flow diagram illustrating a client-side methodology for execution by one or more computing devices according to various embodiments of the present invention. The method 400 operates, in step 410, where a computing device identifies and classifies errors detected between a client application and a remote computing service. Errors are classified into different categories based on several factors, including explicit error responses or other known faults. These may include, but are not limited to, connection timeouts, request write timeouts, response read timeouts, temporary service unavailability errors, overload protection errors, network routing errors, etc.

The method 400 then continues in step 420 by maintaining service specific statistics across all communication points associated with the computing service and storing the statistics within a metric data store. Such statistics include success, errors, latency, caching performance, location, etc.

The method 400 then continues in step 430 by providing an interface for introspecting the health of the computing service via metrics stored within the metric data store. SMI provides interface 308 for computing service operators to introspect the health of the service using the metrics available in the SM-MD. In addition, the computing service operators can tune certain parameters that can influence the service routing decisions as described hereafter.

The method 400 then continues in step 440 by monitoring the health of the computing service via the metric data store. It quantifies the health of the computing service by maintaining metrics associated with service endpoints and then using that to compute overall health of the service. The health of the service is used to drive the client perceived state of the service. This in turn influences weights that are assigned to a service endpoint of group of endpoints that will ultimately determine how the client requests will be routed. The advantage here is that outside of normal operating state, the client takes over routing decisions based on its view of the computing service. Typical computing service monitoring is not co-located with the client and therefore does not see the view of the computing service from the perspective of the client. The method 400 then continues by assigning an operational state to the computing device based on metrics stored with the metric data store. The health of the computational service will dictate the operational state of the SRE. For example, the operation state of the SRE can vary from normal to degraded to failover (disaster recovery) depending on the amount of errors being seen.

The method 400 then continues in step 450 by determining how to most optimally route the client request based on the operational state of the computing service and, in step 460, routes the client request to the computing service via the most optimal route.

The Intelligent Service Routing 310 part of SRE uses the SM-MD 306 to examine trends across different service endpoints to make decisions as to how to most optimally route the application request. Several strategies can be employed for making routing decisions. This could be as simple as routing based on closest location or more advanced where a score is computed for individual service endpoints using the metrics available in SM-MD.

Figure 5:
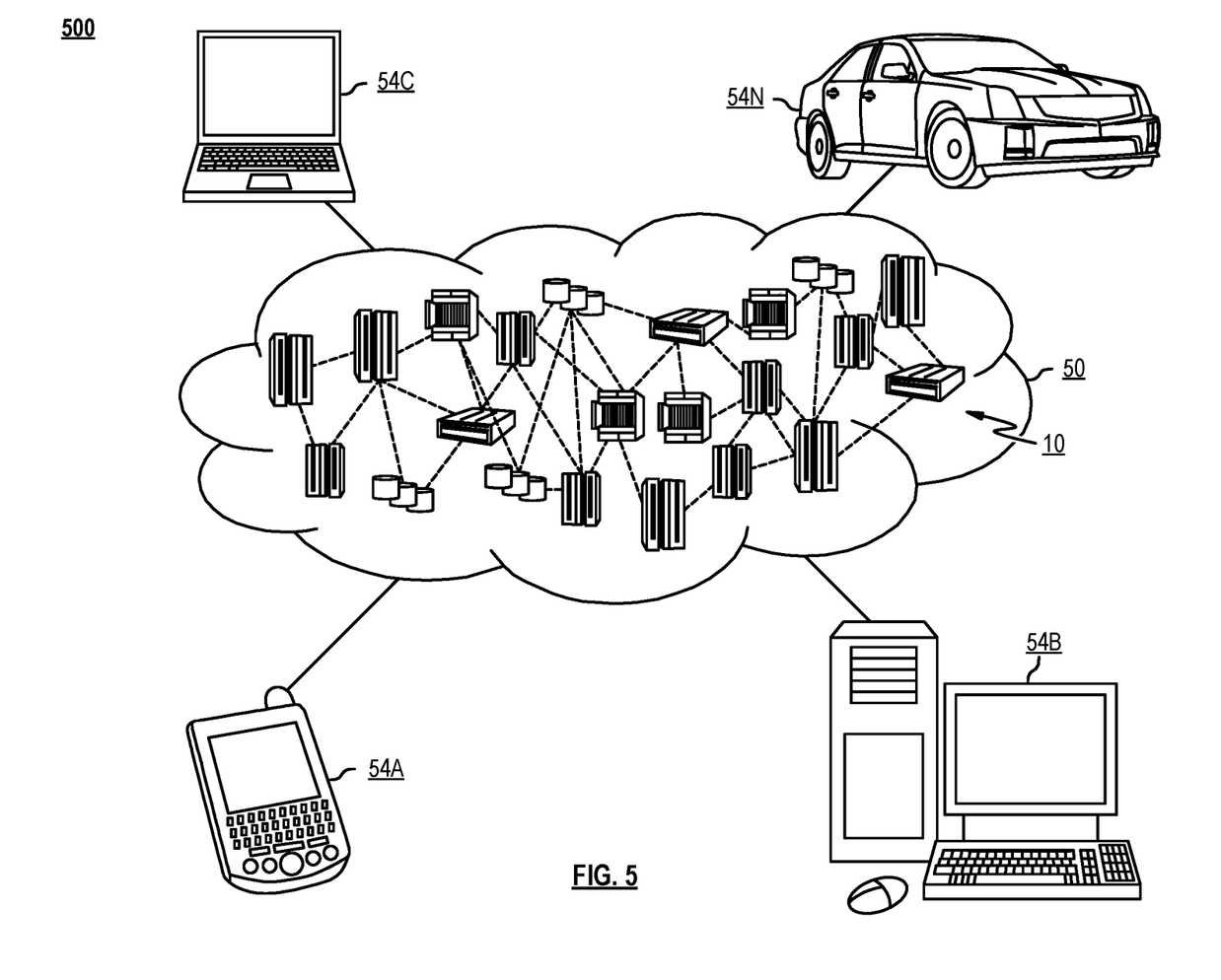
FIG. 5 depicts a cloud computing environment according to various embodiments of the present invention.

FIG. 5 depicts a cloud computing environment 50 according to various embodiments of the present invention. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
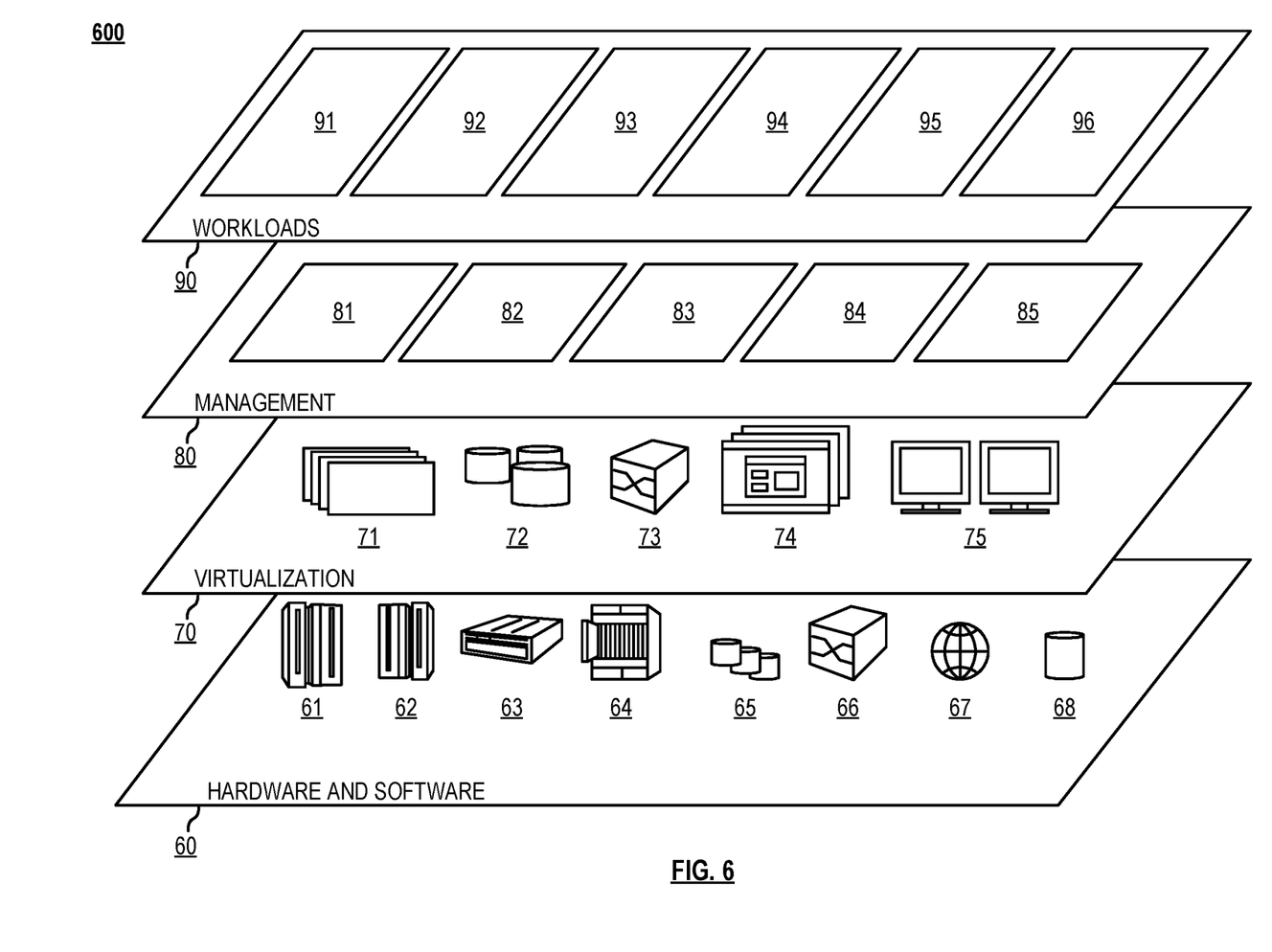
FIG. 6 depicts abstraction model layers according to various embodiments of the present invention.

FIG. 6 depicts abstraction model layers according to various embodiments of the present invention. Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68. In some embodiments, one or more hardware components can be implemented by utilizing the computing device 701 of FIG. 7.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication system navigation history tracking, processing, and operations 96.

FIG. 7 depicts a block diagram 700 of a computing device according to various embodiments of the present invention. FIG. 7 depicts a block diagram of components of a computing device 701, which can be utilized to implement some or all of the cloud computing nodes 10, some or all of the computing devices 54A-N of FIG. 5, and/or to implement other computing devices described herein in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 701 can include one or more processors 702, one or more computer-readable RAMs 704, one or more computer-readable ROMs 706, one or more computer readable storage media 708, device drivers 712, read/write drive or interface 714, and network adapter or interface 716, all interconnected over a communications fabric 718. Communications fabric 718 can be implemented with any architecture designed for passing data and/or control information between processors (such as microprocessors, communications and network processors, etc.), system memory, peripheral devices, and any other hardware components within the system.

One or more operating systems 710 and/or application programs 711, such as network application server software 67 and database software 68, are stored on one or more of the computer readable storage media 708 for execution by one or more of the processors 702 via one or more of the respective RAMs 704 (which typically include cache memory). In the illustrated embodiment, each of the computer readable storage media 708 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the invention.

Computing device 701 can also include a R/W drive or interface 714 to read from and write to one or more portable computer readable storage media 726. Application programs 711 on computing devices 701 can be stored on one or more of the portable computer readable storage media 726, read via the respective R/W drive or interface 714 and loaded into the respective computer readable storage media 708.

Computing device 701 can also include a network adapter or interface 716, such as a TCP/IP adapter card or wireless communication adapter. Application programs 711 on computing devices 54A-N can be downloaded to the computing device from an external computer or external storage device via a network (for example, the Internet, a local area network or other wide area networks or wireless networks) and network adapter or interface 716. From the network adapter or interface 716, the programs may be loaded into the computer readable storage media 708. The network may comprise copper wires, optical fibers, wireless transmission, routers, firewalls, switches, gateway computers and edge servers.

Computing device 701 can also include a display screen 720, a keyboard or keypad 722, and a computer mouse or touchpad 724. Device drivers 712 interface to display screen 720 for imaging, to keyboard or keypad 722, to computer mouse or touchpad 724, and/or to display screen 720 for pressure sensing of alphanumeric character entry and user selections. The device drivers 712, R/W drive or interface 714, and network adapter or interface 716 can comprise hardware and software stored in computer readable storage media 708 and/or ROM 706.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

The present invention may be a system, a method, and/or a computer program product at any possible technical detail level of integration. The computer program product may include a computer readable storage medium (or media) having computer readable program instructions thereon for causing a processor to carry out aspects of the present invention.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method of providing routing of a client request from a client application to a computing service, comprises the steps of:
   identifying and classifying errors detected between the client application and the computing service;
   maintaining service specific statistics across communication points associated with the computing service and storing the service specific statistics as metrics within a metric data store;
   providing an interface for introspecting a health of the computing service via the metrics stored within the metric data store;
   monitoring the health of the computing service via the metric data store, and assigning an operational state based on the metrics stored within the metric data store;
   determining how to optimally route the client request based on the operational state of the computing service;
   routing the client request to the computing service via the optimal route; and
   determining the health of the computing service by calculating a score based on:

$Se = Wes(1-Ee)/(Le)$, where:

Se—is a score associated with a service endpoint;
   Wes—is a weight assigned to the service endpoint or a tier of service endpoints depending on the operational state;
   Ee—is an error ratio (number of errors/number of client requests) for the service endpoint; and
   Le—is an average latency measured on the service endpoint.

2. The method of claim 1, wherein the health of the computing service is determined by maintaining metrics associated with service endpoints and computing the health of the computing service based on the metrics.

3. The method of claim 1, wherein the health of the computing service determines weights assigned to service endpoints of a group of endpoints to influence the routing the client request.

4. The method of claim 3 further comprises using the weights to steer traffic towards or away from specific service endpoint(s) by increasing or decreasing, respectively, the weights associated with it.

5. The method of claim 3, wherein the service endpoints of a group of endpoints are grouped together into tiers by assigning a same weight to the service endpoints of a group of endpoints in a same tier.

6. The method of claim 5, wherein the tiers are used to provide primary, secondary, or tertiary tiers of service.

7. The method of claim 6, wherein the weights associated with the service endpoints of a group of endpoints or tiers are dynamically adjusted to react to error conditions to favor one endpoint or tier more than the other.

8. The method of claim 1 further comprises using the score of a specific endpoint to weight an amount of the client request to be directed to the specific endpoint.

9. The method of claim 8, wherein the score of a specific endpoint to weight an amount of the client request to direct to the specific endpoint creates a load balancing decision across available ones of the service endpoints of a group of endpoints.

10. The method of claim 1, wherein the health of the computing service varies from normal to degraded to failover depending on an amount of the errors identified.

11. The method of claim 1 further comprises a scoring method to maintain an overall error score reflecting a total error rate across service endpoints as per: $Es = \Sigma_{e=1}^{N} Ee$.

12. The method of claim 1 further comprises a scoring method to maintain a score for a group or tier of endpoints.

13. The method of claim 1, wherein the health of the computing service is compared against pre-configured thresholds to change the operational state.

14. The method of claim 1 further comprises, when the health of the computing service improves, relinquishing the determining how to optimally route the client request to a default server-side mechanism associated with the computing service.

15. The method of claim 1, wherein the operational state reflects one or more of: communication issues, performance issues, full memories, nearly full memories, repairs needed, maintenance needed, outages, or outdated systems.

16. The method of claim 1, wherein the errors include one or more: connection timeouts, request write timeouts, response read timeouts, temporary service unavailability errors, overload protection errors, or network routing errors.

17. The method of claim 1, wherein the service specific statistics include any of: successes, errors, latency, caching performance, or location.

18. A method of providing routing of a client request from a client application to a computing service, comprises the steps of:
   identifying and classifying errors detected between the client application and the computing service;
   maintaining service specific statistics across communication points associated with the computing service, and storing the service specific statistics as metrics within a metric data store;
   monitoring the health of the computing service via the metric data store, and assigning an operational state based on the metrics stored within the metric data store;
   determining, based on operational state outside of normal operating state, to optimally route the client request with direction from a client, wherein client routing decisions supersede server-side routing decisions;
   routing the client request to the computing service via the optimal route; and
   determining the health of the computing service by calculating a score based on:

$Se = Wes(1-Ee)/(Le)$, where:

Se—is a score associated with a service endpoint;
   Wes—is a weight assigned to the service endpoint or a tier of service endpoints depending on the operational state;
   Ee—is an error ratio (number of errors/number of client requests) for the service endpoint; and
   Le—is an average latency measured on the service endpoint.

19. A computing device comprises:
   a computer-based service routing engine including:

a service monitoring module including a service endpoint metric database and an interface configured to interface and communicate with a communication system;
a service routing module including a scoring and weighting module; and
a failure escalation and recovery module;
memory that stores operational instructions; and
processing circuitry operably coupled to the service monitoring module, the service routing module, the failure escalation and recovery module, and the memory, wherein the processing circuitry is configured to execute the operational instructions to:
identify and classify, by the service monitoring and introspection module, errors detected between a client application and a computing service;
maintain, by the service endpoint metric database, service specific statistics across all communication points as metrics associated with the computing service;
monitor, by the service routing module, a health of the computing service via the metrics associated with the computing service, and assign, by the failure escalation and recovery module, an operational state of the computing device based on the metrics associated with the computing service;
determine, by the service routing module, how to most optimally route a client application request based on the operational state of the computing service;
route, by the service routing module, the client applications request to the computing service via the most optimal route; and
determine the health of the computing service by calculating a score based on:

$$Se = Wes(1-Ee)/(Le), \text{ where:}$$

Se—is a score associated with a service endpoint;
Wes—is a weight assigned to the service endpoint or a tier of service endpoints depending on the operational state;
Ee—is an error ratio (number of errors/number of client requests) for the service endpoint; and
Le—is an average latency measured on the service endpoint.

\* \* \* \* \*